(12) United States Patent
Rowe

(10) Patent No.: US 6,205,771 B1
(45) Date of Patent: Mar. 27, 2001

(54) DUCTED FAN GAS TURBINE ENGINE CONTROL SYSTEM

(75) Inventor: Arthur L Rowe, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/440,161

(22) Filed: Nov. 15, 1999

(30) Foreign Application Priority Data

Aug. 3, 1999 (GB) .................................................. 9918092

(51) Int. Cl.[7] .................................................. F02C 9/54
(52) U.S. Cl. ........................ 60/226.1; 60/240; 60/39.27
(58) Field of Search ........................... 60/39.27, 226.1, 60/239, 240, 243

(56) References Cited

U.S. PATENT DOCUMENTS 4,414,807 * 11/1983 Kerr ........................................ 60/239
5,259,188 * 11/1993 Baxter et al. ........................... 60/239
5,303,545 * 4/1994 Larkin ..................................... 60/239

* cited by examiner

*Primary Examiner*—Louis J. Casaregola
(74) *Attorney, Agent, or Firm*—W. Warren Taltavull; Farkas & Manelli PLLC

(57) ABSTRACT

A control system for a ducted fan gas turbine engine (10) comprises a control unit (29) that receives input signals from a pressure transducer (27) located within the engine's fan duct (11) downstream of the fan (13) and a rotational speed transducer (32) mounted adjacent the shaft (24) carrying the fan (13). In the event of the control unit (29) detecting a fall in the air pressure downstream of the fan (13) and an increase in fan speed, it commands a temporary reduction in the fuel flow to the engine (10). Such a decrease in the air pressure downstream of the fan (13) and increase in fan speed is indicative of the fan (13) entering a stall condition. The temporary reduction in fuel flow to the engine (10) enables the fan (13) to recover from that stall condition.

8 Claims, 1 Drawing Sheet

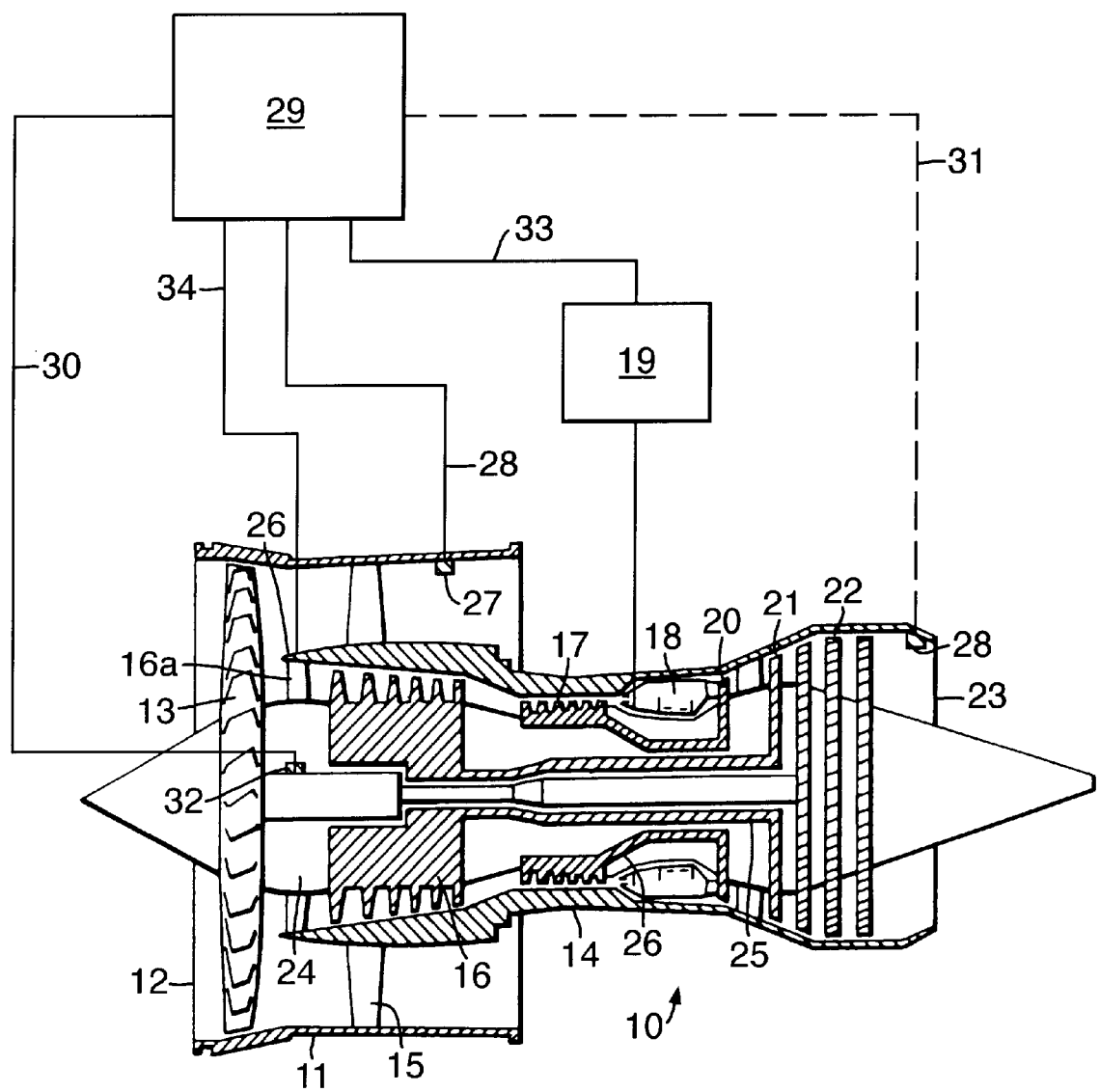

DUCTED FAN GAS TURBINE ENGINE CONTROL SYSTEM

This invention relates to a ducted fan gas turbine engine control system and is particularly concerned with a control system that detects a stall condition in the fan of the engine and subsequently modulates certain operating parameters of the engine in order to facilitate the recovery of the fan from its stall condition.

When a ducted fan gas turbine engine powering an aircraft is required to operate at low or zero forward speed when there are crosswinds, there can be a tendency for at least the tip region of the engine's fan to stall. This can also occur under certain wind conditions when the engine is mounted on an aircraft in such a manner that its air intake is close to the ground. Typically these events are liable to occur during the initial stages of aircraft take-off.

It is believed that fan stall can occur when air flow separation takes place within the engine air intake, resulting in diffusion and circumferential air flow distortion.

A fan can sometimes recovers from a stall as a result of the drop in engine power that accompanies the stall. This is particularly so in the case of a fan stall that is accompanied by a stall in the core engine that drives the fan. However, under certain conditions, a fan stall can occur that is not accompanied by a core engine stall. If this happens, it is possible for the fan to remain in a stall condition with the result that a continuous, unstable airflow occurs downstream of the fan. Such an unstable airflow is highly undesirable in view of the structural damage that it can do to engine components in its path.

It is an object of the present invention to provide a control system for a ducted fan gas turbine engine which is capable of detecting a fan stall condition and taking action which results in the fan recovering from that stall condition.

According to the present invention, a control system for a ducted fan gas turbine engine having a propulsive fan driven by a core engine, comprises means to monitor the rotational speed of said propulsive fan, means to monitor the power absorption of said fan and means to provide a temporary reduction in the fuel flow to said core engine in the event of a fall in the monitored power absorption of said fan accompanied by an increase in the monitored rotational speed of said fan.

Said control system may be adapted for use with a ducted fan gas turbine propulsion engine having a core engine which includes a compressor portion, said control system being provided with means to provide a simultaneous, temporary reduction in the power absorption of said compressor portion with said temporary reduction in said fuel flow to said core engine.

Said compressor portion of said core engine may be provided with variable inlet guide vanes, said control system being provided with means to actuate said variable inlet guide vanes in such a manner as to provide said simultaneous, temporary reduction in the power absorption of said compressor portion followed by a return of said inlet guide vanes to positions consistent with normal engine operation at a rate corresponding with that at which the fuel flow to said core engine is restored to a level consistent with said normal engine operation.

Said means to monitor the power absorption of said propulsive fan of said engine fan may comprise a transducer positioned and arranged to monitor the air pressure downstream of said propulsive fan.

Alternatively, said means to monitor the power absorption of said propulsive fan of said engine comprises a transducer positioned downstream of a turbine portion of said core engine to monitor the gas pressure downstream of that turbine portion.

Said means to monitor the rotational speed of said propulsive fan may comprise a transducer positioned and arranged to monitor the rotational speed of a shaft drivingly interconnecting said propulsive fan and said core engine.

Said fuel flow is preferably temporarily reduced for a period of between 1 and 2 seconds.

Said fuel flow may be temporarily reduced for a period of approximately 1.2 seconds.

The invention will now be described, by way of example, with reference to the accompanying drawing which is a diagrammatic representation of a ducted fan gas turbine engine provided with a control system in accordance with the present invention.

With reference to the drawing, a ducted fan gas turbine engine for aircraft propulsion generally indicated at 10 is of the three shaft type. It comprises an annular cross-section fan duct 11 having an air intake 12 and enclosing a propulsive fan 13. The fan duct 11 extends some way downstream of the fan 13 and is supported from a core engine 14 by a plurality of radially extending outlet guide vanes 15.

The core engine 14 drives the fan 13 and comprises, in axial flow series, an intermediate pressure compressor 16, high pressure compressor 17, combustion equipment 18 associated with a fuel supply unit 19, and high, intermediate and low pressure turbines 20, 21 and 22 respectively. A propulsion nozzle 23 is located downstream of the low pressure turbine 22. The fan 13 is driven by the low pressure turbine 21 via a first shaft 24, the intermediate pressure compressor 16 by the intermediate pressure turbine 20 via a second shaft 25 and the high pressure compressor 17 by the high pressure turbine 20 via a third shaft 26. The first, second and third shafts 24, 25 and 26 are mounted concentrically within the core engine 10.

The intermediate pressure compressor 16 is provided at its upstream end with an annular array of variable angle inlet guide vanes 16a. The variable vanes 16a are of known configuration and are associated with a suitable known actuation mechanism (not shown) which causes the vanes 16a to pivot about their radial axes in unison to vary the inlet angle of the air flow from the fan 13 into the intermediate pressure compressor 16. Variation of the air inlet angle is necessary under certain engine operating conditions to vary the operating characteristics of the intermediate pressure compressor 16.

The gas turbine engine 10 functions in the conventional manner. Air drawn in through the fan air intake 12 is accelerated by the fan 13 before being divided into two concentric flows by an annular flow divider 26 positioned at the upstream end of the core engine 14. The first, radially inner flow is directed into the intermediate pressure compressor 16 of the core engine 14. There it is compressed before being directed into the high pressure compressor 17 where further compression takes place. The resultant, highly compressed air is then directed into the combustion equipment 18 where it is mixed with fuel supplied from the fuel supply unit 19 and the mixture combusted.

The resultant hot gaseous combustion products then expand through, and thereby drive, the high, intermediate and low pressure turbines 20, 21 and 22 before exhausting to atmosphere through the propulsion nozzle 23 to provide propulsive thrust.

The second, radially outer flow of air accelerated by the fan 13 flows through the fan duct 11 over the outlet guide vanes 15 before exhausting from the downstream end of the fan duct 11 to provide additional propulsive thrust.

Under certain conditions in which the ducted fan gas turbine engine 10 is operating at high power but is stationary or moving forward at low speed, for instance during aircraft takeoff, airflow problems in the intake 12 can give rise to the fan 13 stalling, at least in its tip region. This, as mentioned earlier, is undesirable in view of the air flow disturbances that this can cause downstream of the fan 13.

The present invention is particularly concerned with the detection of a stall condition in the fan 13 and the modulation of certain engine operating parameters in order to enable the fan 13 to recover from that stall condition.

In the event of the fan 13 entering a stall condition, its power absorption falls rapidly. In this embodiment of the present invention, such fan power absorption is detected by monitoring the air pressure in the fan duct 11 downstream of the fan 13 by means of a pressure transducer 27. The pressure transducer 27 is located on the radially inner surface of the fan duct 11 downstream of the fan 13 and of the outlet guide vanes 15. More than one pressure transducer 27 may be positioned within the fan duct 11 if necessary in order to ensure an accurate indication of the air pressure within the fan duct 11.

It will be appreciated, however, that other means could be employed in order to detect fan power absorption. For example, in a mixed flow engine, the gas pressure at the outlet of the low pressure turbine 22 is dependent upon fan power and so any reduction in fan power will result in a corresponding reduction in that gas pressure. A pressure transducer 28 could therefore be positioned upstream of the propulsion nozzle 23 to monitor the low pressure turbine 22 exhaust gas pressure. Alternatively, a small diameter pipe could interconnect the propulsion nozzle 23 with a pressure transducer positioned at a more convenient location.

The pressure transducer 27 positioned in the fan duct 11 provides an output signal that is representative of the air pressure within the fan duct 11 and hence the degree of power absorption of the fan 13. That signal is directed via a line 28 to an electronic control unit 29. An interrupted line 31 indicates an alternative connection line between the pressure transducer 28 mounted downstream of the low pressure turbine 22 and the control unit 29.

On its own, a fall in fan power absorption is not fully indicative of a stall condition in fan 13 and could be brought about by factors unrelated to fan stall. Consequently a further parameter is necessary to provide confirmation of fan stall. We have determined that a suitable parameter is the rotational speed of the fan 13.

In the event of the fan 13 entering a stall condition, there is, in addition to the immediate fall in its power absorption, an increase in its rotational speed. This is opposite to what would be expected under normal fan operation in which a fall in fan power absorption would be accompanied by a fall in fan rotational speed.

Accordingly, the control unit 29 receives an additional signal via a line 30 that interconnects the control unit 29 with a speed transducer 32 located adjacent the first shaft 24 interconnecting the fan 13 and the low pressure turbine 22. The speed transducer 32 provides an output signal to the control unit 29 representative of the rotational speed of the first shaft 24, and hence the fan 13.

The electronic control unit 29 is arranged to monitor the signals from the pressure and speed transducers 27 and 32 and in particular the rate of change of those signals. If the control unit 29 detects a situation in which the air pressure in the fan duct 11 is falling while at the same time the rotational speed of the fan 13 is increasing, an output signal 33 is sent to the fuel supply unit 19. That signal causes the fuel control unit 19 to provide a sudden and temporary reduction in the rate of fuel flow to the combustion equipment 18. Typically, the time duration of this reduction in fuel flow is around 1.2 seconds, although it may be within the range 1 to 2 seconds depending upon the characteristics of the engine 10.

The reduction in fuel supply to the combustion equipment 18 causes the engine 10 to slow down to such an extent that the fan 13 moves out of its stall condition and proceeds to operate in a normal manner. Since the reduction in fuel flow to the engine 10 is temporary, the engine 10 returns quickly to normal operation at the desired power level with the fan 13 no longer in a stall condition.

Although a brief reduction in fuel flow to the combustion equipment is sufficient to allow the fan 13 to recover from a stall condition, it may, under certain circumstances, bring about undesirable side effects upon the operation of the intermediate and high pressure compressors 16 and 17. More specifically, the decrease and subsequent increase in fuel flow to the combustion equipment 18 may, if it is sufficiently rapid, bring about the departure of the compressors 16 and 17 from their normal operating envelopes. Such departure may be sufficient to initiate stalling within those compressors 16 and 17.

In order to ensure that neither of the compressors 16 and 17 suffers from stalling when there is a rapid decrease and increase in fuel flow, the control unit 29 additionally sends a signal via a line 34 to the operating mechanism of the variable inlet guide vanes 16a at the same time as it commands the fuel flow decrease and increase. The inlet guide vanes 16a are caused to actuate in such a manner that the power absorption of the intermediate pressure compressor 16 falls. This ensures that the intermediate pressure compressor 16, and in turn the high pressure compressor 17, are maintained within their normal operating envelopes and so do not go into stall during the reduction in fuel flow to the combustion equipment 18. A further advantage of this mode of operation is that during the period of reduced fuel flow, the rotational speeds of the rotary portions of the engine 10 do not fall to the same extent as they would if the fuel flow reduction was not accompanied by a fall in the power absorption of the intermediate pressure compressor 18. Consequently there is reduced delay in returning the engine 10 to normal operating thrust following a fan stall.

When the fuel flow to the combustion equipment 18 is restored to a level consistent with the desired power output of the engine 10, the settings of the inlet guide vanes 16a are simultaneously returned to values consistent with normal engine operation at that fuel flow level. Moreover, they are returned to those values at a rate which corresponds with that at which the fuel flow is returned to its restored level. This is to ensure that compressor stability is maintained as the fuel flow rate is increased.

The period during which the fuel flow is reduced and the inlet guide vanes 16a are actuated to decrease the power absorption of the intermediate pressure compressor 16 is, as mentioned earlier, between one and two seconds. Consequently, stalling of the fan 13 and recovery from that stall condition is sufficiently brief to ensure that it has minimal effect upon the operation of the engine 10. Moreover, since the air flow disturbances downstream of the fan 13 resulting from the fan stall are only in existence for a short time, they are unlikely to cause structural damage to the engine 10.

What is claimed is:

1. A control system for a ducted fan gas turbine engine having a propulsive fan driven by a core engine, said control system comprising means to monitor the rotational speed of said propulsive fan, means to monitor the power absorption of said fan and means to provide a temporary reduction in the fuel flow to said core engine in the event of a fall in the monitored power absorption of said fan accompanied by an increase in the monitored rotational speed of said fan.

2. A control system for a ducted fan gas turbine propulsion engine as claimed in claim 1 wherein said control system is adapted for use with a ducted fan gas turbine propulsion engine having a core engine which includes a compressor portion, said control system being provided with means to provide a simultaneous, temporary reduction in the power absorption of said compressor portion with said temporary reduction in said fuel flow to said core engine.

3. A control system for a ducted fan gas turbine engine as claimed in claim 2 wherein said compressor portion of said core engine is provided with variable inlet guide vanes, said controls system being provided with means to actuate said variable inlet guide vanes in such a manner as to provide said simultaneous, temporary reduction in the power absorption of said compressor portion followed by a return of said inlet guide vanes to positions consistent with normal engine operation at a rate corresponding with that at which the fuel flow to said core engine is restored to a level consistent with said normal engine operation.

4. A control system for a ducted fan gas turbine engine as claimed in claim 1 wherein said means to monitor the power absorption of said propulsive fan of said engine fan comprises a transducer positioned and arranged to monitor the air pressure downstream of said propulsive fan.

5. A control system for a ducted fan gas turbine engine as claimed in claim 1 wherein said means to monitor the power absorption of said propulsive fan of said engine comprises a transducer positioned downstream of a turbine portion of said core engine to monitor the gas pressure downstream of that turbine portion.

6. A control system for a ducted fan gas turbine engine as claimed in claim 1 wherein said means to monitor the rotational speed of said propulsive fan comprises a transducer positioned and arranged to monitor the rotational speed of a shaft drivingly interconnecting said propulsive fan and said core engine.

7. A control system for a ducted fan gas turbine engine as claimed in claim 1 wherein said fuel flow is temporarily reduced for a period of between 1 and 2 seconds.

8. A control system for a ducted fan gas turbine engine as claimed in claim 7 wherein said fuel flow is temporarily reduced for a period of approximately 1.2 seconds.

\* \* \* \* \*